(12) United States Patent
Park

(10) Patent No.: US 10,554,079 B2
(45) Date of Patent: Feb. 4, 2020

(54) SYSTEM FOR TRANSMITTING ULTRASONIC SHORT-RANGE WIRELESS POWER AND METHOD OF CHARGING ULTRASONIC WIRELESS POWER

(71) Applicant: Seong Hoon Park, Siheung-si (KR)

(72) Inventor: Seong Hoon Park, Siheung-si (KR)

( * ) Notice: Subject to any disclaimer, the term of this patent is extended or adjusted under 35 U.S.C. 154(b) by 0 days.

(21) Appl. No.: 16/238,536

(22) Filed: Jan. 3, 2019

(65) Prior Publication Data

US 2019/0157911 A1 May 23, 2019

Related U.S. Application Data

(62) Division of application No. 15/315,386, filed as application No. PCT/KR2015/005912 on Jun. 12, 2015, now Pat. No. 10,250,077.

(30) Foreign Application Priority Data

Jun. 13, 2014 (KR) .................. 10-2014-0071768

(51) Int. Cl.
*H02J 50/15* (2016.01)
*H02J 7/02* (2016.01)
(Continued)

(52) U.S. Cl.
CPC .............. *H02J 50/15* (2016.02); *H02J 7/025* (2013.01); *H02J 50/40* (2016.02); *H02J 50/60* (2016.02); *H02J 50/80* (2016.02); *H02J 50/90* (2016.02)

(58) Field of Classification Search
CPC .................................. H02J 50/15; H02J 50/80
See application file for complete search history.

(56) References Cited

U.S. PATENT DOCUMENTS 6,798,716 B1 9/2004 Charych
8,974,366 B1 * 3/2015 Radziemski ......... A61N 1/3787
600/16

(Continued)

FOREIGN PATENT DOCUMENTS

KR 10-2011-0062219 A 6/2011
KR 10-2012-0073973 A 7/2012
(Continued)

OTHER PUBLICATIONS

International Search Report for PCT/KR2015/005912 dated Nov. 11, 2015 from Korean Intellectual Property Office.

*Primary Examiner* — Daniel J Cavallari
(74) *Attorney, Agent, or Firm* — Revolution IP, PLLC

(57) ABSTRACT

Disclosed is an ultrasonic short-range wireless power transmission system comprising: an ultrasonic transmission transducer configured to transmit power, wherein the ultrasonic transmission transducer comprises: a converter configured to convert power received from an external power source; a controller configured to control power of a modulator and power of an amplifier; a communication unit configured to communicate with an external reception transducer; a sensor configured to sense ultrasonic waves transferred from an ultrasonic wave emission region; the modulator electrically connected to the controller and configured to generate a signal for ultrasonic short-range wireless power transmission; and the amplifier configured to amplify a modulation signal generated by the modulator and convert the modulation signal into power; and one or more transmission modules configured to receive the power from the amplifier and convert an electrical reception signal into ultrasonic waves.

18 Claims, 13 Drawing Sheets

(51) Int. Cl.
    *H02J 50/80*     (2016.01)
    *H02J 50/40*     (2016.01)
    *H02J 50/90*     (2016.01)
    *H02J 50/60*     (2016.01)

(56) References Cited

U.S. PATENT DOCUMENTS

| | | |
|---|---|---|
| 9,240,688 B2 | 1/2016 | Hwang et al. |
| 2012/0268238 A1 | 10/2012 | Park et al. |
| 2013/0049475 A1 | 2/2013 | Kim et al. |
| 2013/0271088 A1 | 10/2013 | Hwang et al. |
| 2015/0207357 A1 | 7/2015 | Youm |
| 2015/0333528 A1 | 11/2015 | Leabman |

FOREIGN PATENT DOCUMENTS

| | | |
|---|---|---|
| KR | 10-2012-0120692 A | 11/2012 |
| KR | 10-2013-0020035 A | 2/2013 |
| KR | 10-2013-0024320 A | 3/2013 |
| KR | 10-2013-0116703 A | 10/2013 |
| KR | 10-2013-0119837 A | 11/2013 |

\* cited by examiner

<TABLE 1>

<TABLE 2>

FIG. 9

| Properties | PZT-5A | PMN-PT Single crystal |
|---|---|---|
| Density (kg/m$_3$) | 7760 | 8000 |
| Dielectric loss(%) | 2 | <0.5 |
| Dielectric constant | 1600 | >6000 |
| Coupling factor $K_{33}$(%) | 70.5 | 93 |
| Piezoelectric constant $d_{33}$(pC/N) | 374 | >2200 |
| Piezoelectric constant $d_{31}$(pC/N) | -171 | -1338 |
| Voltage output constant $g_{33}$ ($X10^{-3} Vm/N$) | 24.8 | 44 |

SYSTEM FOR TRANSMITTING ULTRASONIC SHORT-RANGE WIRELESS POWER AND METHOD OF CHARGING ULTRASONIC WIRELESS POWER

CROSS REFERENCE TO PRIOR APPLICATION

This application is a divisional Application of U.S. patent application Ser. No. 15/315,386 filed on Dec. 1, 2016 under 35 U.S.C. § 120, which is a National Stage Application of PCT International Patent Application No. PCT/KR2015/005912 filed on Jun. 12, 2015, under 35 U.S.C. § 371, which claims priority to Korean Patent Application No. 10-2014-0071768 filed on Jun. 13, 2014, which are all hereby incorporated by reference in their entirety.

BACKGROUND

The present invention relates to ultrasonic power transmission, and more particularly, to an ultrasonic short-range wireless power transmission system and an ultrasonic wireless power charging method, in which power which is to be received using a plurality of reception transducers and transmitted by a transmission transducer can be maintained constant and the efficiency of power transmission can be increased.

In detail, the present invention relates to an ultrasonic short-range wireless power transmission system in which power is wirelessly supplied to an electric load of a reception transducer via an ultrasonic transmission transducer which transmits power.

Embodiments according to the concept of the present invention relate to a wireless power transmission system capable of constantly maintaining the amount of power to be received by one or more reception transducers using an ultrasonic transmission transducer which transmits power, and increasing power transmission efficiency.

Furthermore, the present invention relates to a technique of wirelessly transmitting energy which may be consumed to an installed reception transducer using ultrasonic waves according to energy harvest technology of collecting energy (solar light, water power, wind power, tidal power, exhaust heat, or vibration) which may be wasted or consumed in everyday life and recycling the energy as electric power.

In addition, the present invention relates to a technique of increasing management and operating efficiency by providing a communication protocol needed for ultrasonic wireless power charging.

Wireless power transmission technologies include a method of using a radio frequency (RF) and a method of using a magnetic field. Examples of the method of using a magnetic field may include a magnetic field induction-based non-contact power transmission method, a magnetic field beam shaping-based short-distance power transmission method, and a magnetic field resonance-based short-distance power transmission method.

Non-contact methods have been increasingly used in the fields of portable electronic devices, portable terminals, charging pads, etc. Such methods are expected to be applied to more portable devices, but are disadvantageous in that a power transmission distance is very short.

In a magnetic field resonance-based wireless power transmission technique, a transmitter and a receiver are designed to resonate with each other, thereby greatly increasing transmission efficiency, but transmission efficiency decreases as the distance between the transmitter and the receiver increases.

The method of using an RF has been used very frequently, for example, in the form of radio frequency identification (RFID). However, a maximum power transmission rate is very low and whether results of conducting a clinical test and a verification test are harmless is not confirmed. It therefore demands a physiological approach.

The magnetic field beam shaping-based short-distance power transmission method is available for electric cars and electric rail cars, but it is not easily applicable to small-sized portable electronic devices since ferrite which is large in size and heavy in weight is used.

The above methods are techniques using an electric field, electromagnetic waves, and a magnetic field, based on Faraday's law, but need to be improved in terms of efficiency and directivity.

Furthermore, a power transmission method using a general ultrasonic transmission device or an array of ultrasonic transmission devices is disclosed in U.S. Pat. No. 6,798,716 B1, in which an array of ultrasonic transmission devices are provided, a beam is focused on a central point by controlling the phases of the ultrasonic transmission devices, and the direction of the beam is adjusted through phase control. Korean Laid-Open Patent Application No. 10-2012-0073973 discloses an ultrasonic transmission device in which a space is formed between an upper plate and a lower part of a radiation plate to increase a natural frequency so that ultrasonic waves may be emitted in a higher order mode, thereby decreasing the thickness of the radiation plate and increasing the hardness thereof. Korean Laid-Open Patent Application No. 10-2013-0119837 discloses an ultrasonic charging power supply module and a polyhedral ultrasonic charging power supply device having the same. Here, a circuit board which converts electric energy obtained through conversion by an ultrasonic reception device into predetermined intensity electric energy; and a secondary battery formed in a package and configured to store the electric energy obtained by the circuit board are provided. The package, a flexible hinge, and a reception vibration plate are formed of a titanium alloy. However, more research is needed to improve this technique so that it may be applicable to portable devices which are required to be embodied in many different forms and manufactured in small sizes.

Furthermore, this technique is limited to a technique of wirelessly transmitting electric energy into a human body from the outside using ultrasonic waves which easily penetrate human tissue such as skin, a muscular layer, or a layer of fat. Thus, this technique is not easily applicable to short-distance wireless power transmission and is expected to have difficulties.

Ultrasonic waves on which ultrasonic power transmission technology will be based hereinafter have a feature that refraction occurs between media due to the difference between propagation velocities of the media. Table 1 of FIG. 8 shows degrees of refraction and reflection in air and water.

The feature of the ultrasonic waves is based on Huygen's principle ($\sin\theta_1/\sin\theta_2 = V_1/V_2 = \lambda_1/\lambda_2 = n$). Here, since V2 is higher than V1, $\theta_2$ is greater than $\theta_1$. In this case, when an angle of incidence $\theta_1$ is decreased toward water, incident waves may not be capable of entering the water ($\theta_2 = 90$).

As shown in Table 1 of FIG. 8, ultrasonic waves are waves which can be easily reflected. A distance and a thickness may be measured using an ultrasound sensor and ultrasonic waves, based on this feature of ultrasonic waves.

A material of a piezoelectric element will be additionally described with reference to Table 2 of FIG. 8 below. PMN-PT is a solid-state single crystal of lead magnesium niobate (PMN) which is a relaxor and lead titanate (PT)

which is a piezoelectric material. PMN-PT is a high-performance relaxor-based piezoelectric single crystal material which has three or more times the piezoelectric distortion of lead zirconium titanate (PZT) ceramics generally used as a piezoelectric material. When voltage is applied to a PZT material in a short pulse form, the PZT material vibrates and generates ultrasonic waves.

As shown in a table of FIG. 9, values d33 and d31 (piezoelectric constants) and a value K33 (electro-mechanical coupling factor) which determine features of a piezoelectric material of PMN-PT single crystal are far greater than those of an existing PZT material. Thus, the physical properties of the PMN-PT single crystal exhibit a higher effect when it is applied to a device using the PMN-PT single crystal.

(1) Electro-Mechanical Coupling Factor K33

The electro-mechanical coupling factor K33 is a coefficient representing conversion efficiency between electric energy and mechanical energy.

As the electro-mechanical coupling factor K33 increases, a device may be manufactured to have a smaller size and consume lower power.

(2) Piezoelectric Constants d33 and d31

The piezoelectric constants d33 and d31 represent a degree of displacement when an electric field (V/m) is applied or a degree of non-displacement in this case. As the piezoelectric constants d33 and d31 increase, finer displacement control may be performed.

Furthermore, the PMN-PT has a piezoelectric constant d33 which is three or more times that of lead zirconium titanate (PZT) ceramics generally used as a piezoelectric material, and has a higher electro-mechanical coupling factor K33 and exhibits higher piezoelectric characteristics than lead zirconium titanate (PZT) ceramics.

With use of a piezoelectric material, electric energy may be converted into mechanical energy and vice versa.

A general micro-electromechanical system (MEMS) is formed of film layers of silicon and lead zirconium titanate (PZT) which are standard materials of a semiconductor electronic device. Using recent technology employing a lead magnesium niobate-lead titanate (PMN-PT) thin-film combined with a silicon material, power may be locally supplied to a node of a wireless sensor of an energy harvesting device or a sensor applicable to a human body.

In addition, basically, ultrasonic waves use a different frequency band according to the type of medium which the ultrasonic waves penetrate. In general, a frequency band of ultrasonic waves used in a medical instrument ranges from 1 MHz to 20 MHz. As a frequency of the ultrasonic waves becomes higher, the resolution of an image is higher but the ultrasonic waves attenuate faster. Thus, the ultrasonic waves cannot deeply penetrate a human body. Thus, high-frequency ultrasonic waves are mainly used to monitor blood vessels or the like. When low-frequency ultrasonic waves are used, the resolution of an image is low but the ultrasonic waves can deeply penetrate a human body. Thus, the low-frequency ultrasonic waves are used for imaging equipment in the fields of obstetrics and gynecology. A 40 kHz ultrasonic transducer generally used as a distance measurement device operates at a skywave band of very low-frequency ultrasonic waves penetrating even air among ultrasonic waves. Actually, ultrasonic waves output from a medical ultrasonic modulator (transducer) of several MHz cannot penetrate air. Thus, when an image is captured, an air layer is prevented from being generated by using gel. Furthermore, when a frequency band becomes higher, impedance of a piezoelectric element also increases and thus a voltage to be applied should be high.

Neither the magnetic field resonance-based wireless power transmission technique nor the magnetic field beam shaping-based short-distance power transmission method is practical in that long-distance power transmission efficiency is low and the amount of energy transferred in the air decreases to be inversely proportional to the square of a distance since power is wirelessly transmitted by arranging a primary coil and a secondary coil to be spaced apart from each other. Furthermore, wireless power transmission performed in a space using a magnetic field or radio waves may have influence on other communication, a human body, an electronic device, etc., and thus much care and improvement or monitoring thereof are required.

The present invention is directed to an ultrasonic short-range wireless power transmission system capable of decreasing a change in power transmission efficiency of ultrasonic short-range wireless power transmission (based on resonance) according to the positions of a plurality of reception transducers using a high-directivity transmission transducer, and increasing power transmission efficiency using a resonance frequency.

The present invention is also directed to a system for wireless charging and ultrasonic short-range wireless power transmission, which is capable of providing optimal short-range power transmission to increase power transmission efficiency and wirelessly charging various types of electronic devices in the field of ultrasonic wave-based short-range wireless power transmission, such as a vehicle, an electric bicycle, a smart phone, an LED illumination device, a smart tablet personal computer (PC), a smart PC, a smart TV, smart glasses, and an MP3/MP4 player.

The present invention is also directed to an ultrasonic wireless power charging method of performing optimal ultrasonic wave-based short-range wireless power transmission to increase charging efficiency.

The present invention is also directed to an ultrasonic wireless power charging method of providing an optimal charging environment to increase charging efficiency using ultra-directivity ultrasonic waves.

The present invention is also directed to a communication method and environment for efficient management and operation of ultrasonic wireless power charging.

The present invention is also directed to a method of providing an environment for the convenience of a user who uses ultrasonic wireless power charging and a service environment for a business operator who manages ultrasonic wireless power charging, and a system therefor.

SUMMARY

The components of the present invention disclosed herein may be arranged and designed in various different manners as will be briefly described below and illustrated in the appended drawings. Thus, the following description as illustrated in the drawings is not intended to restrict the scope of the present invention and should be understood as representing examples of combinations of the components.

As described above, the present invention is directed to a method of providing an environment for the convenience of a user who uses ultrasonic wireless power charging and a service environment for a business operator who manages ultrasonic wireless power charging, and a system therefor.

One aspect of the present invention provides an ultrasonic short-range wireless power transmission system in which a transmitter and a receiver of an external transmission transducer and a reception transducer are configured such that resonant frequencies thereof match each other, and a mutual resonance frequency is used or a communication means is provided to establish communication between the external transmission transducer and the reception transducer.

The communication means may be one of a wideband, Wifi, Bluetooth, Zigbee, Near Field Communication (NFC), Infrared Data Association (IRDA), Beacon, and a UWB.

Here, Beacon will be briefly described. Beacon is communication technology whereby, if it is installed in a specific place using a wireless sensor to which short-range position recognition technology is applied, various information, a Bluetooth service for indoor positioning, etc. are provided through mutual recognition between Beacon and a smart device in which Bluetooth technology is installed when the smart device or the like approaches the specific place.

An ultrasonic wave-based wireless power transmission system according to an embodiment of the present invention is capable of decreasing a change in power transmission efficiency according to the position of a receiver. That is, even when a user uses a mobile device during movement, the user may seamlessly use the mobile device.

In particular, a plurality of power transmitters may be driven at different phases to transmit power at higher power transmission efficiency than a wireless power transmission system according to the related art.

In an ultrasonic wireless power charging method according to the present invention, various electronic devices such as a vehicle, an electric bicycle, a smart phone, an LED illustration device, a smart tablet PC, a smart PC, a smart TV, smart glasses, an MP3/MP4 player, an intelligent CCTV, etc. may be wirelessly charged and a wireless power transmission system may be provided.

Furthermore, a communication protocol for ultrasonic wireless power charging may be provided to increase management and operation efficiency.

In addition, subscriber information provided to an ultrasonic wireless power reception device and authentication are processed step by step to make a payment to an external server through either an ultrasonic wireless power transmission device or an ultrasonic wireless power reception device, thereby increasing the convenience for a user who uses ultrasonic wireless charging.

BRIEF DESCRIPTION OF THE DRAWINGS

The appended drawings are not intended to be drawn to scale. In the drawings, the same reference numerals or no reference numerals are assigned to the same or substantially elements. For clarity, not all components in all drawings are assigned reference numerals. The present invention should not be construed as being limited to specific forms disclosed herein.

FIG. 9 is a table showing electro-mechanical coupling factors and piezoelectric characteristics of PMN-PT and lead zirconium titanate (PZT) ceramics which are materials of a piezoelectric element according to the present invention.

DETAILED DESCRIPTION

Figure 1:
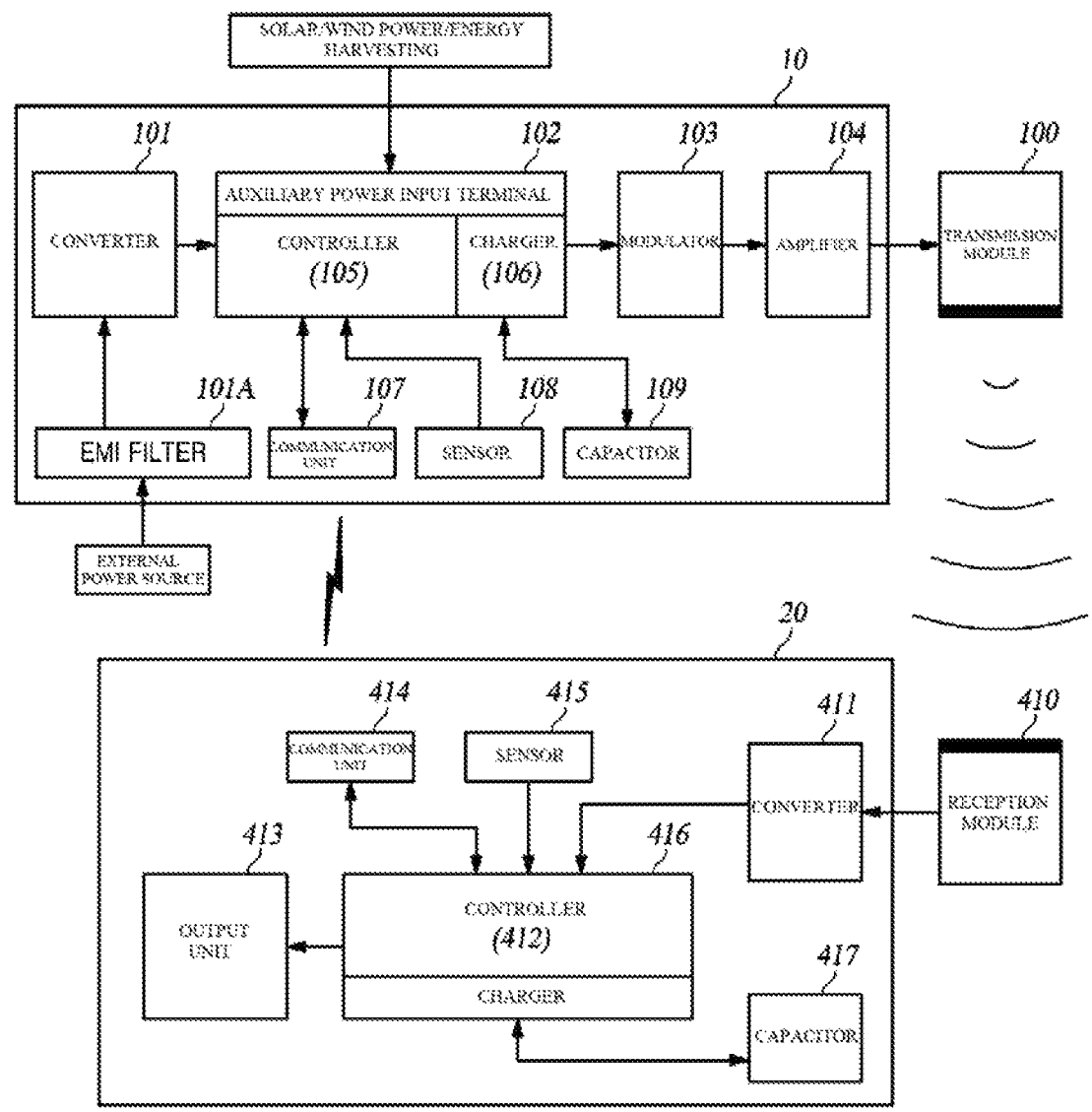
FIG. 1 is a schematic block diagram of an ultrasonic short-range wireless power transmission system using an ultrasonic transmission transducer and an ultrasonic reception transducer according to an embodiment of the present invention.

The present invention relates to application of a piezoelectric effect or a magnetostriction effect using a transducer which converts ultrasonic energy of 20 kHz or more into mechanical vibration of 20 kHz or more.

Piezoelectric effects are classified into a positive effect generating an electric field proportional to stress and an adverse effect causing distortion due to the electric field. The positive effect and the adverse effect are opposite to each other. All crystals are divided into thirty-two crystal systems. It is known that twenty types of crystal systems having no center of symmetry cause the piezoelectric effect to occur among the thirty-two crystal systems. When a bar type or thin-film type crystal sample is selected among these twenty types of crystal systems and an alternating current (AC) electric field is applied to an appropriate electrode, an external force of the same frequency as the applied electric field is generated. When the frequency of the electric field is the same as elastic oscillation natural frequency (resonance frequency) of the crystal sample, the crystal sample resonates and vibrates to a large extent. A piezoelectricity oscillator uses the above property of the crystal sample.

When a force is applied to a certain type of a crystal in a certain direction, electric charges move in the material of the crystal and thus a neutral state breaks down. Thus, the crystal is divided into a part having positive charges and a part having negative charges. This dielectric polarization phenomenon called the piezoelectric effect was discovered in 1880 by the French physician Curie.

In ultrasonic short-range wireless power transmission according to the present invention, when an external force is continuously applied to reception transducers of the same natural frequency as a transmission transducer, amplitude of the reception transducers significantly increases. Such resonance includes mechanical vibration and electrical vibration. Here, the electrical resonance will be described. Piezoelectric elements of the reception transducers resonate with each other when a plurality of piezoelectric elements spaced a certain distance or less from each other oscillate due to ultrasonic waves of the same frequency. Thus, resistance between reception transducers of the same natural frequency as the transmission transducer decreases.

A plurality of components of the present invention will be described below. It would be obvious, however, that the present invention may be embodied in many different forms and either or both of specific structures and functions which will be described below are merely representative examples.

It would be apparent to those of ordinary skill in the art that the structures which will be described below may be embodied regardless of other random structures and two or more structures among the structures may be combined in various manners, on the basis of the following description.

For example, an apparatus may be embodied or a method may be performed using an arbitrary number of components among the components which will be described below.

Such an apparatus may be embodied or such a method may be performed by adding another structure or function to at least one among the components which will be described below or by using different structures and functions of components other than these components.

Here, some components of a transmission transducer and some components of a reception transducer may be assigned the same names. For example, different reference numerals are assigned to a capacitor, a communication unit, a sensor, and a piezoelectric element of the transmission transducer, and a capacitor, a communication unit, a sensor, and a piezoelectric element of the reception transducer.

The components of the present invention disclosed herein and the structures and functions thereof will be described with reference to the accompanying drawings below. FIG. 1 is a schematic block diagram of an ultrasonic short-range wireless power transmission system using an ultrasonic transmission transducer and an ultrasonic reception transducer according to an embodiment of the present invention.

As illustrated in FIG. 1, an ultrasonic transmission transducer 10 includes a converter 101 having an EMI filter 101A electrically connected to an input terminal of an external power source, a controller 105, a modulator 103, an amplifier 104, and a transmission module 100.

Here, a converter which converts an AC voltage into a direct current (DC) voltage, an inverter which converts a DC voltage into an AC voltage, or a converter which converts a DC voltage into a DC voltage may be selected as the converter 101.

The controller 105 receives and processes information from a charger 106, a sensor 108, an auxiliary power input terminal 102, and a communication unit 107. A capacitor 109 including a charger which converts power supplied by the converter 101 or the auxiliary power input terminal 102 into predetermined intensity electric energy and a low-voltage blocking circuit may be further provided. A charging function of receiving and processing state information (a charging voltage, charged capacity, temperature, etc.) of the capacitor 109 may be provided. A function of determining an event signal 120 received from the communication unit 107 and adjusting a value of power output from the amplifier 104 may be provided. Whether a reception transducer is sensed through the communication unit 107 or the sensor 108 may be determined to block power of the ultrasonic transmission transducer 10 or a low-power standby state may be switched to for reception of a signal from the reception transducer.

Furthermore, the controller 105 may include a power distributor which determines whether a reception transducer is sensed by the communication unit 107 or the sensor 108 of FIG. 1, senses the amount of power of a plurality of reception transducers sensed by the communication unit 107, and performs power distribution. Information regarding the event signal 120, a state of the capacitor 109, a capacitor exchange history, a power consumption rate, an active state or history of the sensor 108, a history of usage of a reception transducer sensed by the communication unit 107, etc. may be updated and stored in an internal memory of the controller 105.

The controller 105 further includes the auxiliary power input terminal 102 to alternatively provide an external auxiliary power supply in an easier way. Here, the external auxiliary power supply may be a USB power source, a power source included in a communication line, a solar cell (sunlight generation), wind power generation, or energy harvesting using piezoelectric energy.

The charger 106 receives the state information of the capacitor 109, transmits it to the controller 105, senses a charging voltage applied to the capacitor 109 on the basis of the state information of the capacitor 109, and controls a state of the capacitor 109 to be optimized.

As described above, a constant current circuit or a constant voltage circuit may be further provided to provide a rated voltage, a rated current, charged capacity, residual power quantity, etc. of the capacitor 109 and sensing information of a voltage sensor and maintain a charging voltage of the capacitor 109 constant.

The communication unit 107 is used as a means for sensing whether there is a reception transducer, and transmits an event signal to the controller 105 to determine whether a plurality of reception transducers are sensed by the communication unit 107 and the event signal to determine the order of priority by determining the number (amount) of measured reception transducers, the amount of received power, a reception rate, or location information. Here, a reception transducer sensed at an initial stage or a ranking of reception transducers enduring power shortage, and information regarding the reception transducers may be further taken into account for the determination of the order of priority (priority).

A main purpose and function of the sensor 108 are to determine whether an ultrasonic signal transferred when ultrasonic waves are generated by the transmission module 100 is within or above an allowable range, and determine the amount of the transferred ultrasonic signal to control power to be supplied to the modulator 103, the amplifier 104, and the ultrasonic transmission transducer 10. The power which is to be supplied is generated or blocked to adjust (control) the amount of emission of ultrasonic waves according to a reference signal provided from the controller 105.

Main functions of the modulator 103 and the amplifier 104 will be described below. A signal modulated by the modulator 103 is modulated or oscillates to a resonance frequency band (an impedance matching process) for ultrasonic short-range wireless power transmission. The resonance frequency band is formed to be in a range of 20 kHz to 20 MHz according to a medium (air, water, or a gas).

Here, a signal obtained by the modulator 103 modulating power, which is supplied by the controller 105, is not effective power and thus needs to be amplified to desired power.

Furthermore, the modulator 103 may be configured to perform a modulation process by selecting a high-frequency band or a low-frequency band.

The signal obtained through modulation by the modulator 103 is input to the amplifier 104 which performs effect-power conversion and power of the amplifier 104 is transmitted to the transmission module 100 to perform ultrasonic wireless power transmission. The modulator 103 may be replaced with an oscillator.

Figure 2:
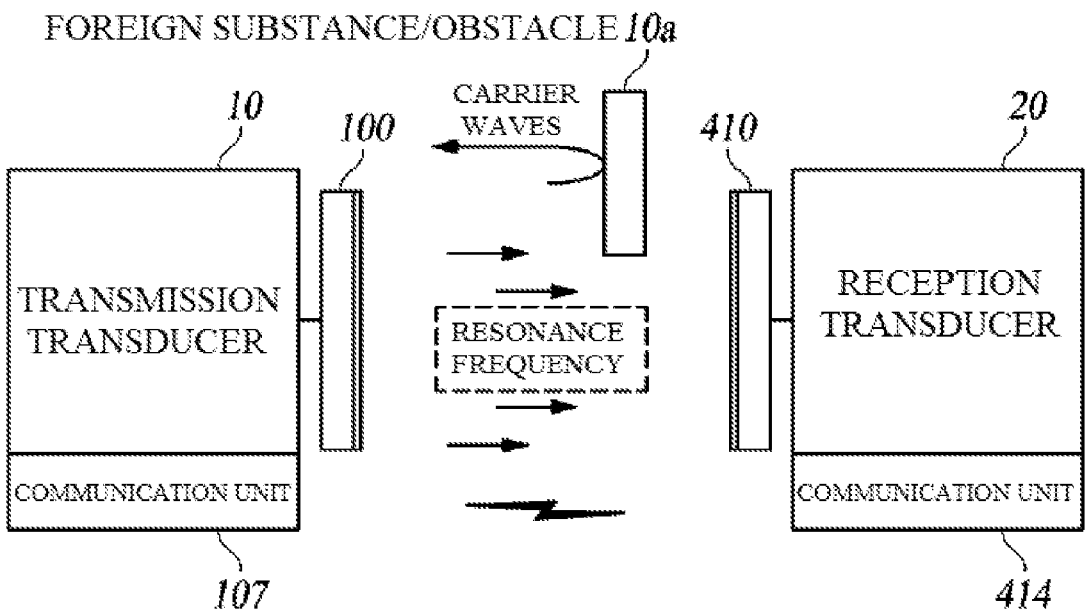
FIG. 2 is a schematic block diagram illustrating ultrasonic wave-based short-range wireless power transmission using an ultrasonic short-range wireless power transmission system according to an embodiment of the present invention.

FIG. 2 is a schematic block diagram illustrating ultrasonic wave-based short-range wireless power transmission using an ultrasonic short-range wireless power transmission system according to an embodiment of the present invention.

A process of generating carrier waves will be described with reference to FIG. 2 below.

FIG. 2 is a flowchart of a process of operating a transmission transducer and a reception transducer, in which a process of generating carrier waves, the flow of a resonance frequency, and an example of communication conducted by a communication unit according to another embodiment of the present invention are illustrated.

The carrier waves may be used to determine the intensity of an ultrasonic signal transferred according to the Doppler effect to sense an obstacle or a foreign substance of a transmission module 100 of a transmission transducer 10. When it is sensed that the intensity of a signal of the carrier waves is beyond a predetermined allowance range, power of the transmission transducer 10 may be switched to a standby state or blocked conditionally.

Figure 3:
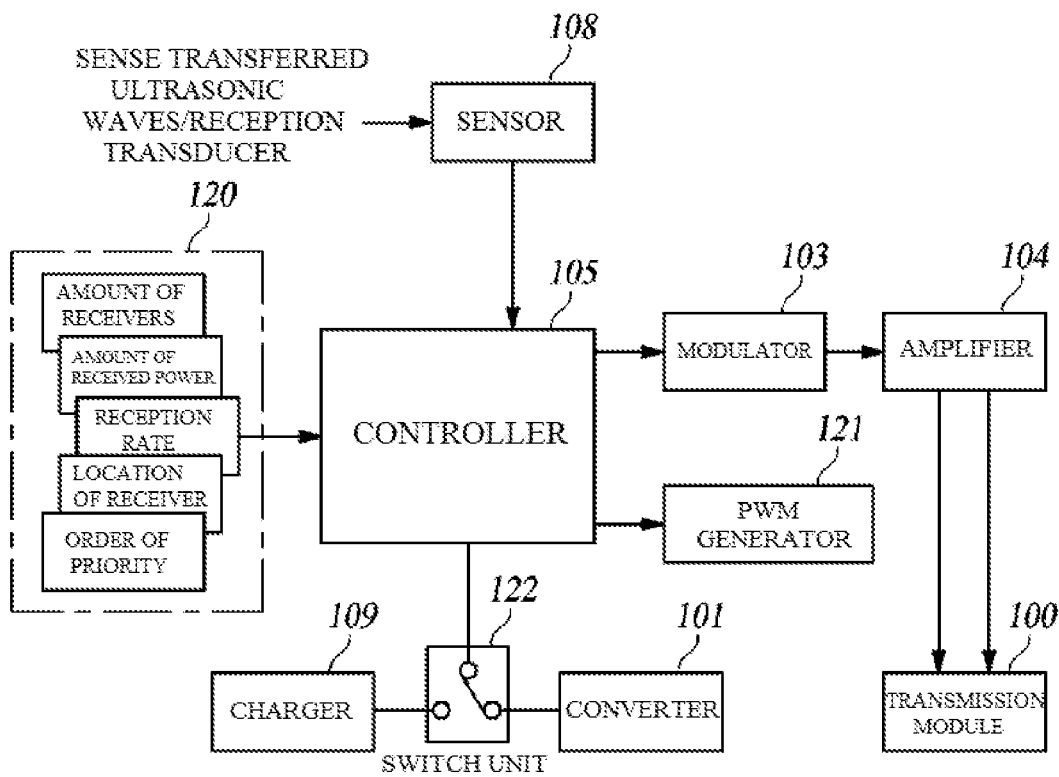
FIG. 3 is a block diagram illustrating the structures of an event signal, a PWM generator, and a sensor according to an embodiment of the present invention.

FIG. 3 is a block diagram illustrating the structures of an event signal, a PWM generator, and a sensor according to an embodiment of the present invention.

Components according to the present invention and the structures and operations thereof will be described with reference to FIG. 3 below. In a modulator 103 and an amplifier 104 which generate a signal for ultrasonic short-range wireless power transmission according to an embodiment, current and voltage supplied according to a PWM method are provided to the amplifier 104.

A signal obtained through conversion by the modulator 103 may be embodied as a PWM generator 121 controlling pulse width modulation (PWM) to optimally improve conversion efficiency at a specific frequency band (a resonance frequency). A switch element (not shown) included in the amplifier 104 and configured to be switch-driven according to a duty cycle controlled by the modulator 103 for effective power conversion is provided.

A signal of the modulator 103 may be converted into or replaced with a sawtooth wave, a pulse wave, a square wave, or the like. The modulator 103 may be replaced with an oscillator.

In one embodiment, the controller 105 includes a switch unit 122 (switch means) configured to switch to power of a capacitor 109 when a voltage of a converter 101 or an auxiliary power input terminal 102 is less than a predetermined value.

Furthermore, power supplied to the auxiliary power input terminal 102 is set to be supplied to the modulator 103 and the amplifier 104 when a voltage applied to the auxiliary power input terminal 102 is greater than or equal to a predetermined value, and power of the converter 101 is restored when the voltage applied to the auxiliary power input terminal 102 is less than the predetermined value.

Here, the controller 105 may perform control to switch from the power of the converter 101 to the power of the capacitor 109 when a voltage of the capacitor 109 is received and is greater than or equal to the predetermined value, and to switch from the power of the capacitor 109 to the power of the converter 101 when the voltage of the capacitor 109 is sensed and is less than the predetermined value.

As illustrated in the drawings, in the above structure, a means that senses a voltage of the auxiliary power input terminal 102 may be provided so that a hysteresis value of voltage fluctuation may be set not to influence the performance and sensitivity of short-range wireless power transmission.

FIG. 3 is a block diagram illustrating a case in which the event signal 120 is input to the controller 105. The event signal 120 will be described in more detail with reference to FIG. 4 below.

Figure 4:
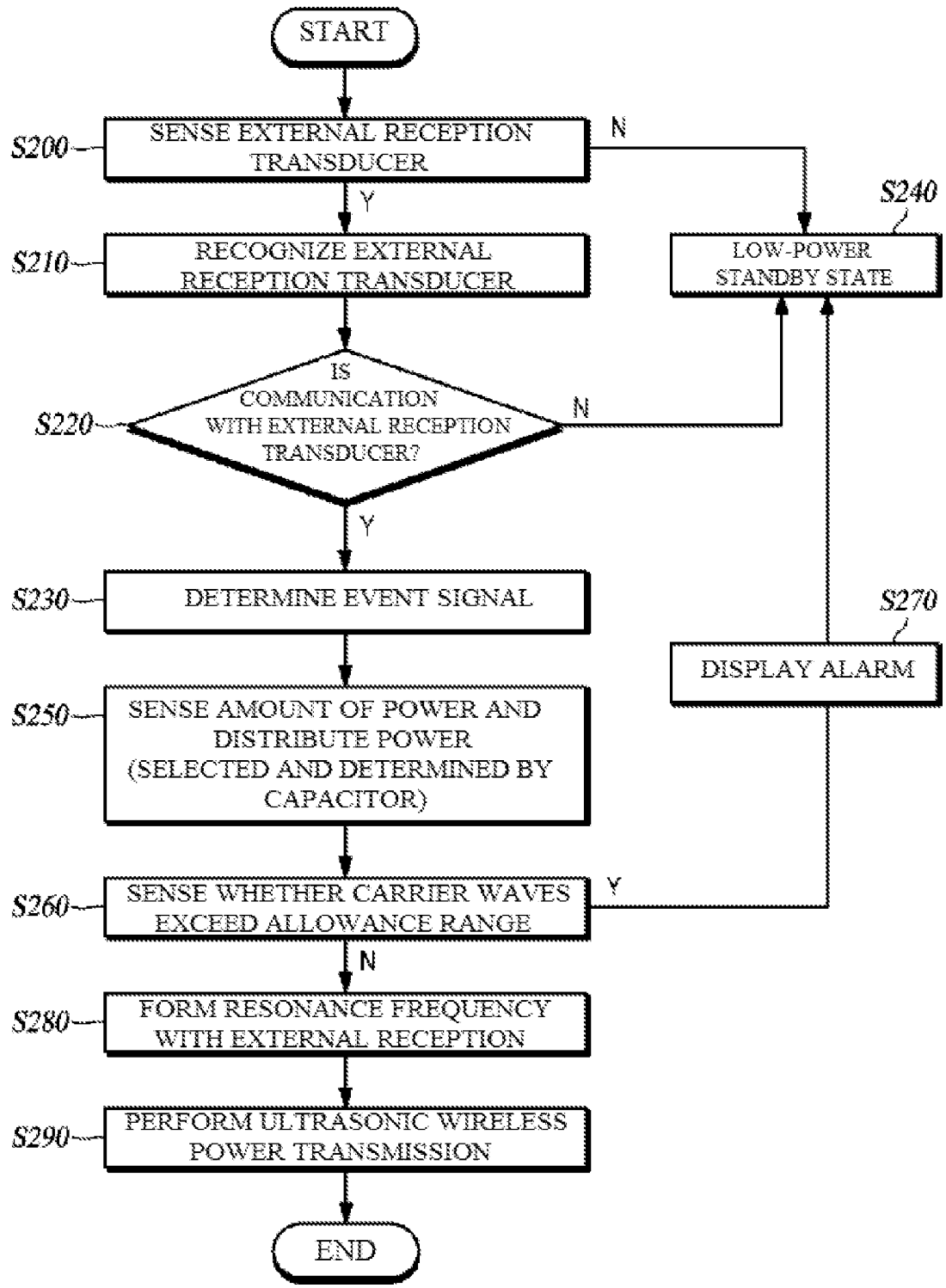
FIG. 4 is a flowchart illustrating operations of a transmission transducer of an ultrasonic short-range wireless power transmission system according to an embodiment of the present invention.

FIG. 4 is a flowchart illustrating operations of a transmission transducer of an ultrasonic short-range wireless power transmission system according to an embodiment of the present invention.

The flowchart will be described with reference to FIG. 4 below. First, a wireless power transmission system of a transmission transducer according to the present invention is installed in an internal structure such as a building, a streetlamp, indoors, a factory, a public building crowded with people, etc. to sense an external reception transducer within a predetermined distance (operation S200).

When an external reception transducer is sensed, the external reception transducer is recognized using a predetermined value for an existing target to be sensed or a specific ID assigned to the existing target to determine whether the external reception transducer may be recognized by the transmission transducer (operation S210).

After the external reception transducer is recognized, communication is established with the external reception transducer to determine information (the amount of power, a load factor, a resonance frequency, etc.) stored in the external reception transducer and determine whether ultrasonic wireless power transmission is to be performed (operation S220).

In this case, when it is determined that communication cannot be established with the external reception transducer (N), a low-power standby state is switched to (operation S240). When the communication is completed (Y), the event signal 120 is received as communication information to determine the number of measured reception transducers, a reception rate, the locations of the measured reception transducers, the order of priority assigned thereto, etc. (operation S230).

The event signal 120 may include information regarding ultrasonic wireless power reception states of the reception transducers, transmission efficiency, etc.

After the event signal 120 is determined, when a plurality of reception transducers are sensed, the amount of power is calculated and power distribution is performed (operation S250) so that the power may be supplied highly efficiently and not concentrated on a particular reception transducer, in consideration of a total amount of power to be supplied from the transmission transducer.

A wireless power transmission system may be interfered with by an interfering material or an obstacle. When ultrasonic waves are transmitted from the transmission module 100 connected to the transmission transducer, whether carrier waves for sensing an interfering material, an obstacle, a foreign substance, etc. in the transmission module 100 exceed an allowance range is sensed (operation S260). When the carrier waves sense a foreign substance, an interfering material, or an obstacle of the transmission module 100 and are thus in an active state (Y), an alarm is displayed on the transmission transducer (operation S270) and the low-power standby state is switched to (operation S240), so that the transmission transducer may be protected and the life span thereof may be increased.

Whether the carrier waves exceed the allowable range should be checked in real time.

When a result of sensing whether the carrier waves exceed the allowable range indicates that the carrier waves are in an inactive state (N), a resonance frequency is formed with the reception transducer (operation S280) and ultrasonic wireless power transmission is started (operation S290). Here, whether a frequency band to be transmitted matches the resonance frequency may be further determined.

Figure 5:
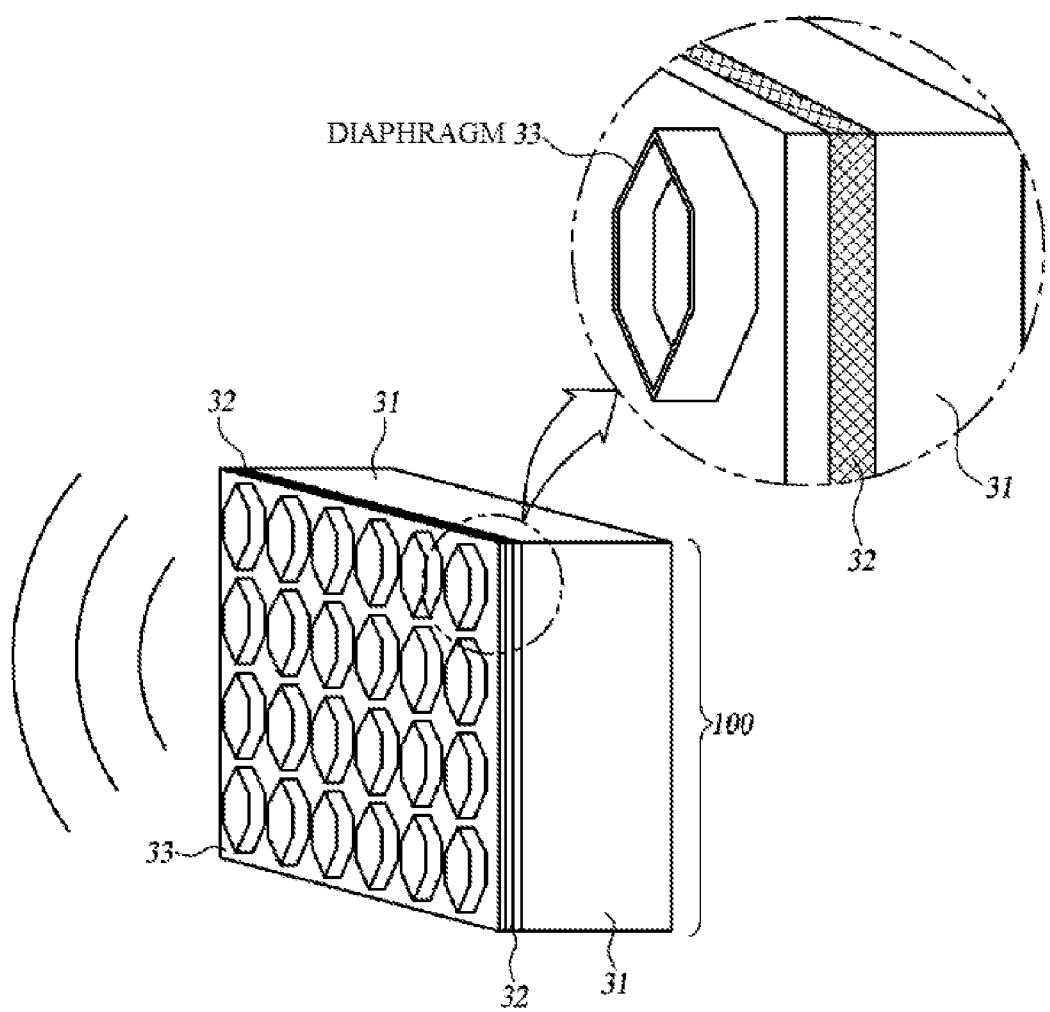
FIG. 5 is a side view of a transmission module connected to an ultrasonic transmission transducer according to an embodiment of the present invention.

FIG. 5 is a side view of a transmission module connected to an ultrasonic transmission transducer according to an embodiment of the present invention.

Referring to FIG. 5, a transmission module 100 of an ultrasonic short-range wireless power transmission system according to the present invention includes a piezoelectric element 32 which converts an electrical signal received from an amplifier into ultrasonic waves, a diaphragm 33 which converts mechanical vibration energy of the piezoelectric element 32 into ultrasonic waves, and a platform 31 in which the piezoelectric element 32 and the diaphragm 33 are accommodated.

Here, the piezoelectric element 32 may be formed in a single layer or multiple layers. The diaphragm 33 and the platform 31 may be manufactured by die casting and thus may be easily manufactured. A material of the piezoelectric element 32 of the transmission module 100 may be a PMN-PT-based material, a PML-PT-based material, or a PZN-PT-based material.

In particular, the diaphragm 33 may be formed in a polygonal shape (a triangular, tetragonal, pentagonal, hexagonal, or octagonal shape) or a honeycomb shape with the shape of the perimeter bored in a central part, and converts ultrasonic energy of the piezoelectric element 32 into mechanical vibration energy, thereby maximizing ultrasonic radiant energy.

In addition, the transmission module 100 or the platform 31 may further include other elements to automatically adjust an optimal frequency of ultrasonic waves or an optimal angle of incidence.

Figure 6:
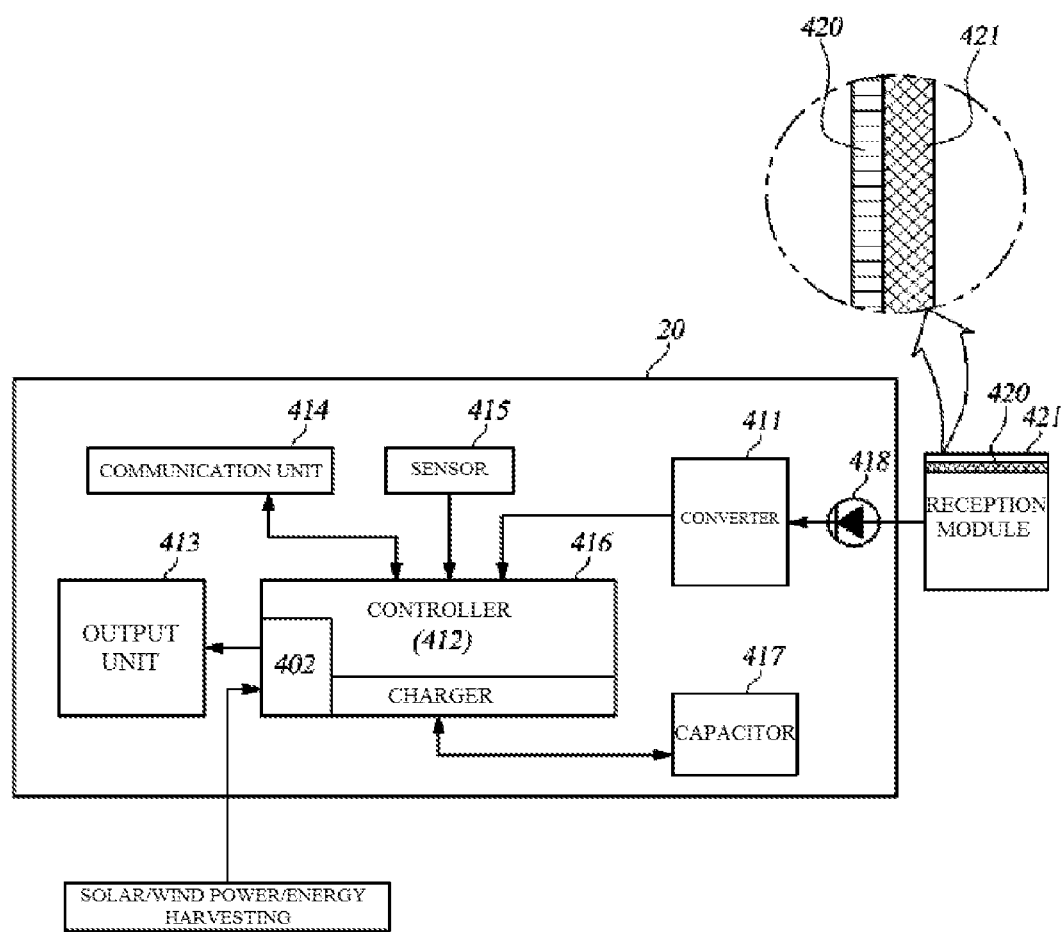
FIG. 6 is a block diagram of an ultrasonic reception transducer according to an embodiment of the present invention.

FIG. 6 is a block diagram of an ultrasonic reception transducer according to an embodiment of the present invention.

As illustrated in FIG. 6, a combination of one or more reception modules may be used to convert an ultrasonic signal of an external transmission transducer into an electrical reception signal.

Figure 8:
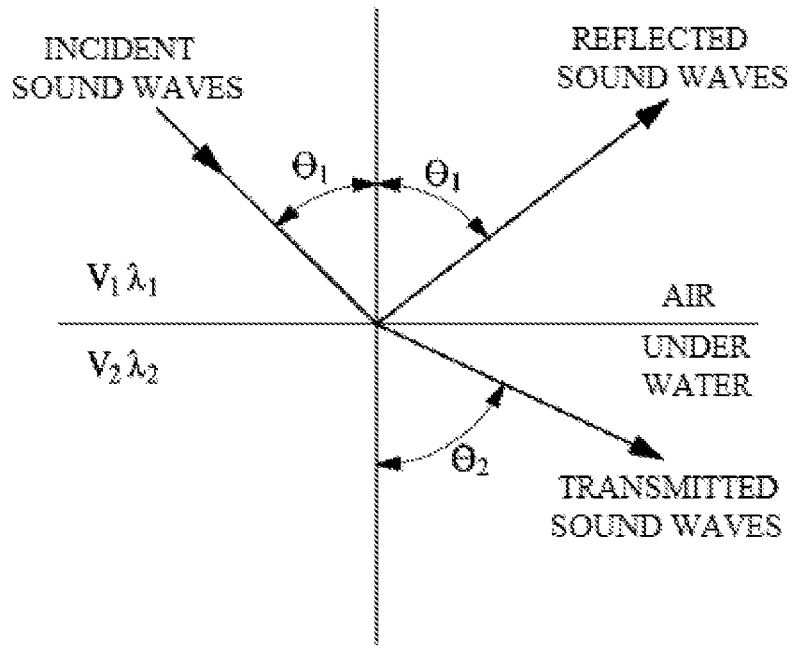
FIG. 8 shows Table 1 which is a graph showing degrees of refraction and reflection in air and water according to the present invention, and Table 2 which shows an electro-mechanical coupling factor and piezoelectric characteristics of a material of a piezoelectric element according to the present invention.
Figure 8:
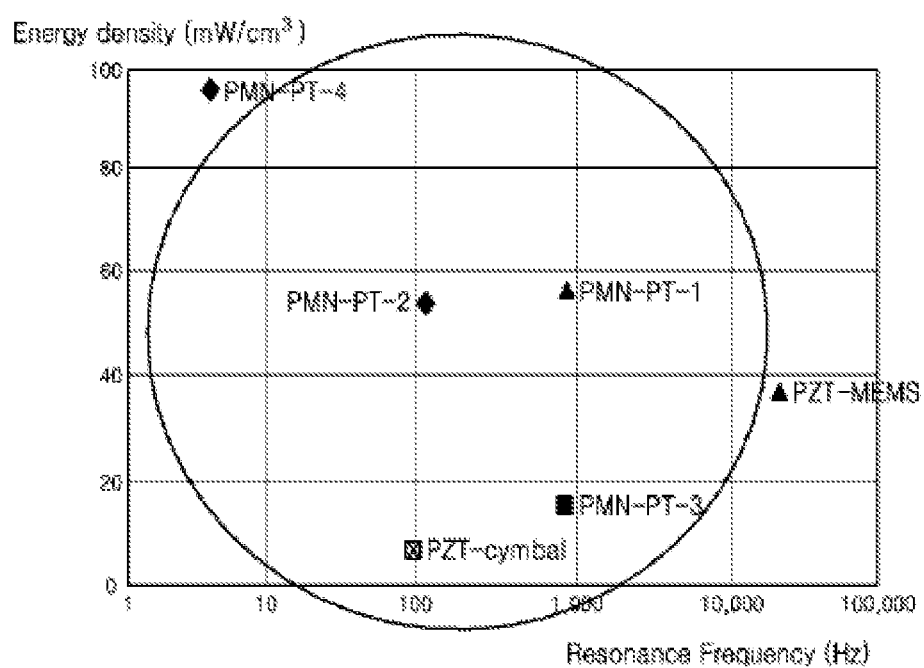

Thus, as a material of a piezoelectric element of a reception transducer 20 according to the present invention, a PMN-PT-based material exhibits a high coupling coefficient and a high piezoelectric property among PMN-PT-based materials, PML-PT-based materials, and PZN-PT-based materials, according to the energy charging density shown in Table 2 of FIG. 8.

For the performance of the piezoelectric property, a technique of precisely matching a natural resonance frequency of an external environment which is to be used and a corresponding frequency (resonance frequency) is needed. For a composition of materials of an element and highly efficient energy reception rate, optimization, power generation characteristics, maximum oscillation, and maximum displacement should be satisfied. A charger circuit should be designed and the performance thereof should be improved using the technique and through interpretation of the structure, and an ultrasonic reception module needs to be embodied in various forms.

A structure of an ultrasonic reception module 410 satisfying a condition of the performance of the piezoelectric property and an optimal circuit thereof will be described with reference to FIG. 6 below. A diaphragm may be formed on a surface or a central part of a body of the reception module 410, a piezoelectric element 420 may be formed on a bottom surface of the diaphragm, and the piezoelectric element 420 and a diaphragm 421 may be coupled to each other while spaced a predetermined distance from each other (a multi-layer structure) to convert mechanical vibration generated when ultrasonic waves are received into electric energy.

A block diagram of an ultrasonic reception transducer of an ultrasonic short-range wireless power transmission system according to the present invention will be described below.

The ultrasonic reception transducer 20 includes a converter 411 electrically connected to the reception module 410, a controller 412, an output unit 413, a communication unit 414, a sensor 415, a charger 416, a capacitor 417, and a reception module 410.

Here, a converter which converts an AC voltage into a DC voltage, an inverter which converts a DC voltage into an AC voltage, or a converter which converts a DC voltage into a DC voltage may be selected as the converter 411.

Main functions of the converter 411 are to rectify power received by the reception module 410 and convert an AC voltage output from the reception module 410 into a DC voltage to be supplied to the controller 412. A rectifier 418 may be further included between the converter 411 and the reception module 410 or between the converter 411 and the controller 412.

Power rectified and modulated by the converter 411 is converted into reception power, is supplied to the controller 412, and is then supplied to the output unit 413 and the charger 416, and thereby ultrasonic wireless power reception is performed.

Furthermore, the converter 411 may also be configured to perform modulation on power received by the reception module 410 by selecting a high-frequency band or a low-frequency band.

In the ultrasonic short-range wireless power transmission system, a predetermined resonance frequency band for reception of power (impedance matching) may be formed to be in a range of 20 kHz to 20 MHz according to values set for the transmission module 100 or the reception module 410.

The controller 412 receives and processes information from the charger 416, the sensor 415, an auxiliary power input unit 402, and the communication unit 414. A capacitor 417 including a charger which converts power received from the converter 411 or the auxiliary power input unit 402 into predetermined intensity electric energy and a low-voltage blocking circuit is further provided. A charging function of receiving and processing state information (a charging voltage, charged capacity, temperature, etc.) of the capacitor 417 may be performed. A function of determining information of an external transmission transducer which is received via the communication unit 414 and adjusting values of power output from the controller 412 and the output unit 413 may be performed. Whether a transmission transducer is sensed through the communication unit 414 or the sensor 415 may be determined to block power of the reception transducer 20 or a low-power standby state may be switched to for reception of a signal from a transmission transducer.

Furthermore, in FIG. 6, the controller 412 may determine whether a transmission transducer is sensed through the communication unit 414 or the sensor 415, and may include a charging controller and a charging determination unit to determine the amount of received power and adjust power to be charged in the capacitor 417 by sensing the amount of power of a transmission transducer sensed by the communication unit 414. The controller 412 may update information regarding a state of the capacitor 417, a power consumption rate, an active state or history of the sensor 415, a history of usage of a transmission transducer sensed by the communication unit 414, etc. and store it in an internal memory.

The controller 412 includes the auxiliary power input unit 402 to further have a function of alternatively providing an external auxiliary power supply in an easier manner. Here, the external auxiliary power supply may be a solar cell (solar generation), a USB power supply, wind power generation, or energy harvesting using piezoelectric energy.

The controller 412 may include a switch means (not shown) configured to perform electrical switching to drive power of the capacitor 417 when a voltage of the converter 411 or the auxiliary power input unit 402 is less than a predetermined value.

When a voltage applied to the auxiliary power input unit 402 is greater than or equal to the predetermined value, power supplied to the auxiliary power input unit 402 may be set to be supplied to the controller 412 and the output unit 413. When the voltage applied to the auxiliary power input unit 402 is less than the predetermined value, power of the converter 411 may be switched to.

Here, the controller 412 may control to switch from the power of the converter 411 to the power of the capacitor 417 when a voltage of the capacitor 417 is sensed to be greater than or equal to a predetermined value and to switch from the power of the capacitor 417 to the power of the converter 411 when the voltage of the capacitor 417 is sensed to be less than the predetermined value. A means which sense voltages of the auxiliary power input unit 402 and the capacitor 417 in real time may be provided, and a hysteresis value of a voltage fluctuation may be set.

The switch unit is the same or substantially the same as that of FIG. 3 and is thus not illustrated or described in detail.

The charger 416 receives the state information of the capacitor 417, transmits it to the controller 412, collects the state information of the capacitor 417 and receives, stores, and controls charging power to be supplied to the capacitor 417.

As described above, a constant current circuit or a constant voltage circuit is further provided to provide information regarding whether each of a rated voltage, a rated current, a charged capacity, residual power quantity, and temperature of the capacitor 417 is above or below an allowance range and sensing information of a voltage sensor, to easily store a charged voltage of the capacitor 417, and to block or control the supply of power when the temperature of the capacitor 417 is above or below the allowance range.

The communication unit 414 is used as a means for sensing whether a transmission transducer is present or not. The communication unit 414 determines whether a plurality of transmission transducers are sensed, the number (amount) of measured transmission transducers, and the amount of power to be transmitted or received, and requests power to be transmitted.

Furthermore, the communication unit 414 determines location information of a transmission transducer, and transmits information to the transmission transducer to determine the order of priority of a reception transducer requesting transmission of power at an earliest time when there are a plurality of reception transducers. Here, a reception transducer sensed at an initial stage or a ranking of reception transducers enduring power shortage, and information regarding the reception transducers may be further taken into account for the determination of the order of priority (priority).

A main purpose and function of the sensor 415 are to determine whether an ultrasonic signal is within or above an allowable range when ultrasonic waves are received from the reception module 410, determine the intensity of a received ultrasonic signal, and control the reception transducer to control power to be supplied to the controller 412, the output unit 413, or the charger 416. The power to be supplied is generated, and controlled or blocked according to a reference signal of the controller 412.

Figure 7:
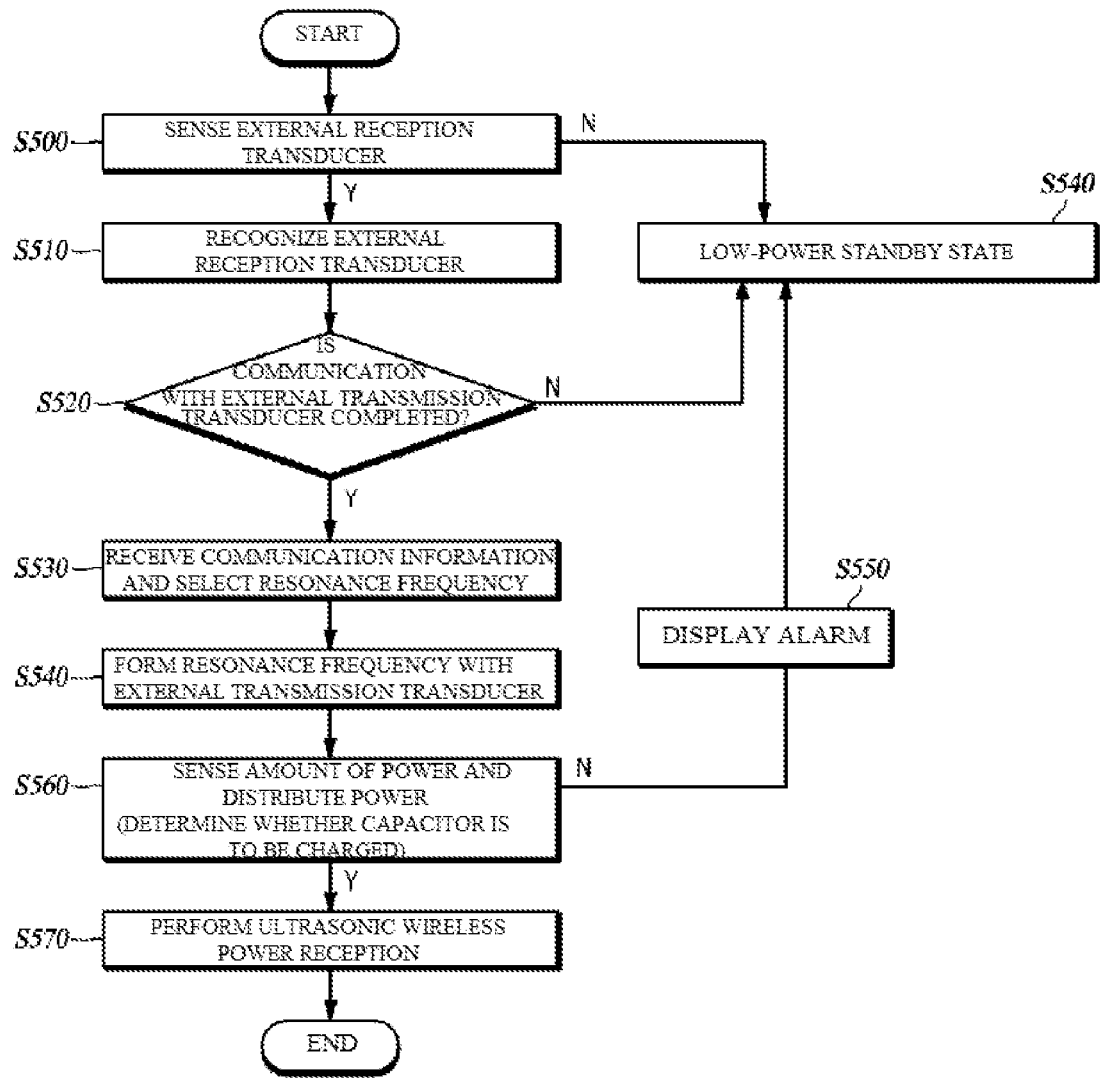
FIG. 7 is a flowchart illustrating operations of an ultrasonic reception transducer according to an embodiment of the present invention.

FIG. 7 is a flowchart illustrating operations of an ultrasonic reception transducer according to an embodiment of the present invention.

The flowchart of FIG. 7 illustrating an operation of a reception transducer according to the present invention is basically substantially the same as the flowchart illustrating the operation of the transmission transducer of FIG. 4 described above, except that whether carrier waves of the external transmission transducer of FIG. 4 or an external reception transducer are beyond an allowable range is sensed and an event signal is determined. Thus, the flowchart of FIG. 7 will be described below focusing on the differences from the flowchart of FIG. 4 by referring to the operations of the flowchart of FIG. 4 except the sensing of whether the carrier waves are beyond the allowable range and the determining of the event signal.

A wireless power transmission system of a reception transducer according to the present invention senses whether an external transmission transducer is at a predetermined location (operation S500).

The external reception transducer is recognized using either a predetermined value representing whether a device is recognizable by the reception transducer or a specific ID assigned to a place at which the transmission transducer is installed (operation S510).

After the external transmission transducer is recognized, communication is established with the external transmission transducer by determining information, e.g., an ID, resonance frequency, etc., stored in the external transmission transducer to determine whether ultrasonic wireless power reception is to be performed (operation S520).

When it is determined in operation S520 that the communication with the external transmission transducer cannot be established (N), a low-power standby state is switched to (operation S540). When it is determined in operation S520 that the communication with the external transmission transducer is completed (Y), the amount of power to be transmitted from the external transmission transducer, a reception rate, location information, a reception state, and transmission efficiency are received as communication information and are determined (operation S520).

The communication information received by the reception transducer may further include, for example, a self-diagnosis result of the external transmission transducer, information of costs of power to be transmitted, the ID assigned to the external transmission transducer, etc. The communication information transmitted in operation S520 may be converted into an image, voice, text, or the like, and provided to a display unit of the reception transducer.

Then the communication information of the external transmission transducer is received and processed to select a resonance frequency (operation S530). Next, the resonance frequency is formed with the external transmission transducer (operation S540).

After operation S540, the amount of power to be transmitted from the external transmission transducer is sensed and power distribution is performed (operation S560), in which whether a capacitor of the reception transducer is to be charged is determined by taking into account a power state of the external transmission transducer including surplus power supply and calculating the amount of power to be supplied to the capacitor of the reception transducer when a plurality of other reception transducers are present in a region. When it is determined, based on obtained information regarding the amount of received power, that the capacitor of the reception transducer cannot be charged (N), an alarm is displayed (operation S550) and the external transmission transducer or the reception transducer is switched to the low-power standby state (operation S540). When it is determined, based on obtained information regarding the amount of received power, that the capacitor of the reception transducer can be charged (Y), ultrasonic wireless power reception is started (operation S570). Here, whether a frequency band to be transmitted and the resonance frequency match each other as described above with reference to FIG. 4 may be further determined.

Figure 10:
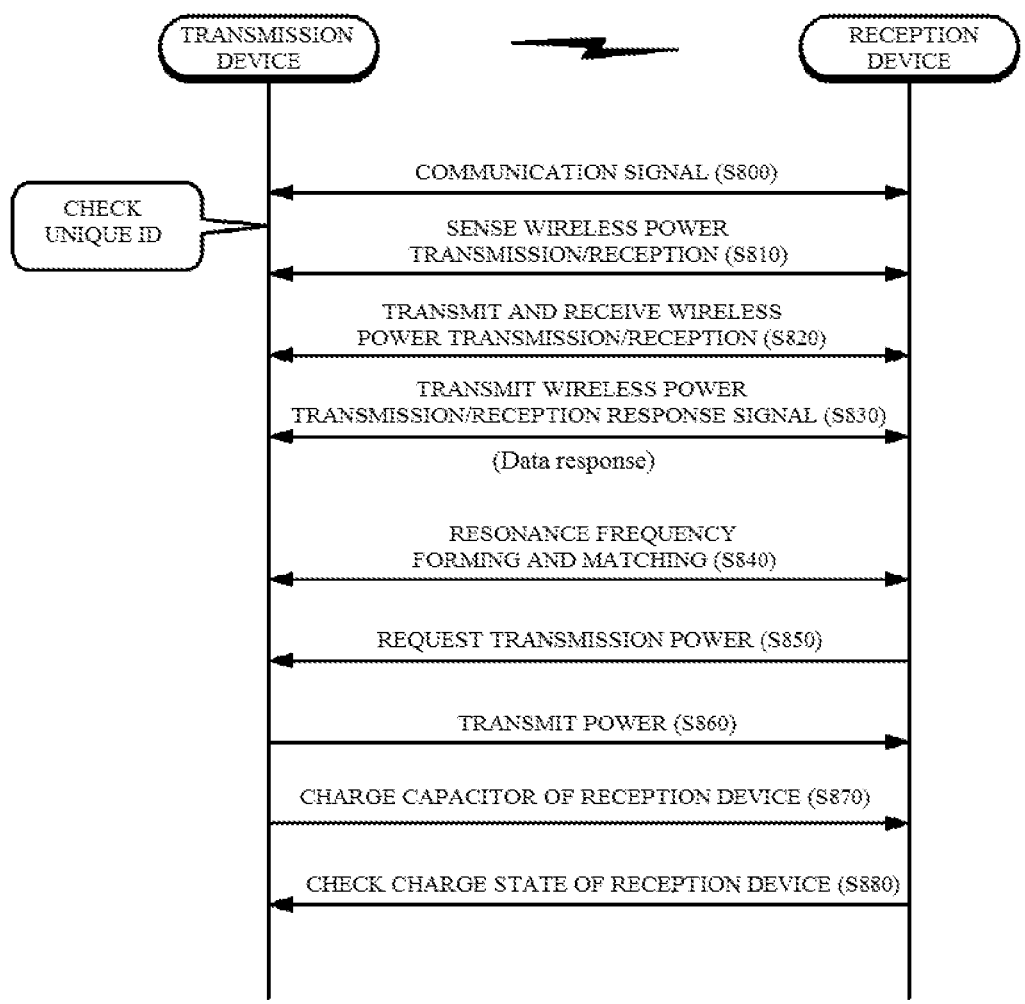
FIG. 10 is a diagram illustrating an ultrasonic wireless power charging method performed by a transmission device and a reception device according to an embodiment of the present invention.

FIG. 10 is a diagram illustrating an ultrasonic wireless power charging method performed by a transmission device and a reception device according to an embodiment of the present invention.

If a user of the reception device wants to charge a capacitor included in the reception device through the transmission device, a communication signal is recognized by sensing the transmission device and the reception device which are within a range using signals generated by communication units of the transmission device and the reception device when the user enters a region in which the transmission device is installed (operation S800).

Here, the communication signal may be recognized according to various methods using, for example, a wideband, Wifi, Bluetooth, Zigbee, NFC, IRDA, Beacon, a UWB, or the like.

The transmission device senses a unique ID of the reception device (operation S810), and transmits or receives information regarding the transmission device and the reception device for ultrasonic wireless power charging (operation S820). Then, sensed signal information of the transmission device and the reception device is transmitted as response signals using information obtained by transmitting or receiving the information regarding the transmission device and the reception device (operation S830).

A resonance frequency is formed and matched between the transmission device and the reception device according to the response signals (operation S840).

In operation S840, forming of a frequency band of the transmission device and the reception device to the resonance frequency band for supplying and receiving power to be transmitted may be further performed.

When the resonance frequency is formed, the reception device requests the transmission device to transmit power (operation S850).

In operation S850, the requesting of the transmission of the power may be canceled when the resonance frequency is not formed and matched between the transmission device and the reception device.

The transmission device transmits power on the basis of information received in operation S850 (operation S860).

Thereafter, the power transmitted using the resonance frequency of the transmission device is received and the capacitor included in the reception device is charged with the power (operation S870). The reception device handles the charging of the capacitor checks a charge state of the capacitor, and transmits a response signal to the transmission device (operation S880).

In the above process, the transmission device may stop or end the transmission of the power when the user of the reception device stops or ends the receiving of the power or when the user is away from the region in which the transmission device is installed.

When no response is made to a wireless power transmission/reception sensing signal in operation S810, the transmission device and the reception device are switched to a standby state while the amount of power of the transmission device or the reception device is controlled.

Figure 11:
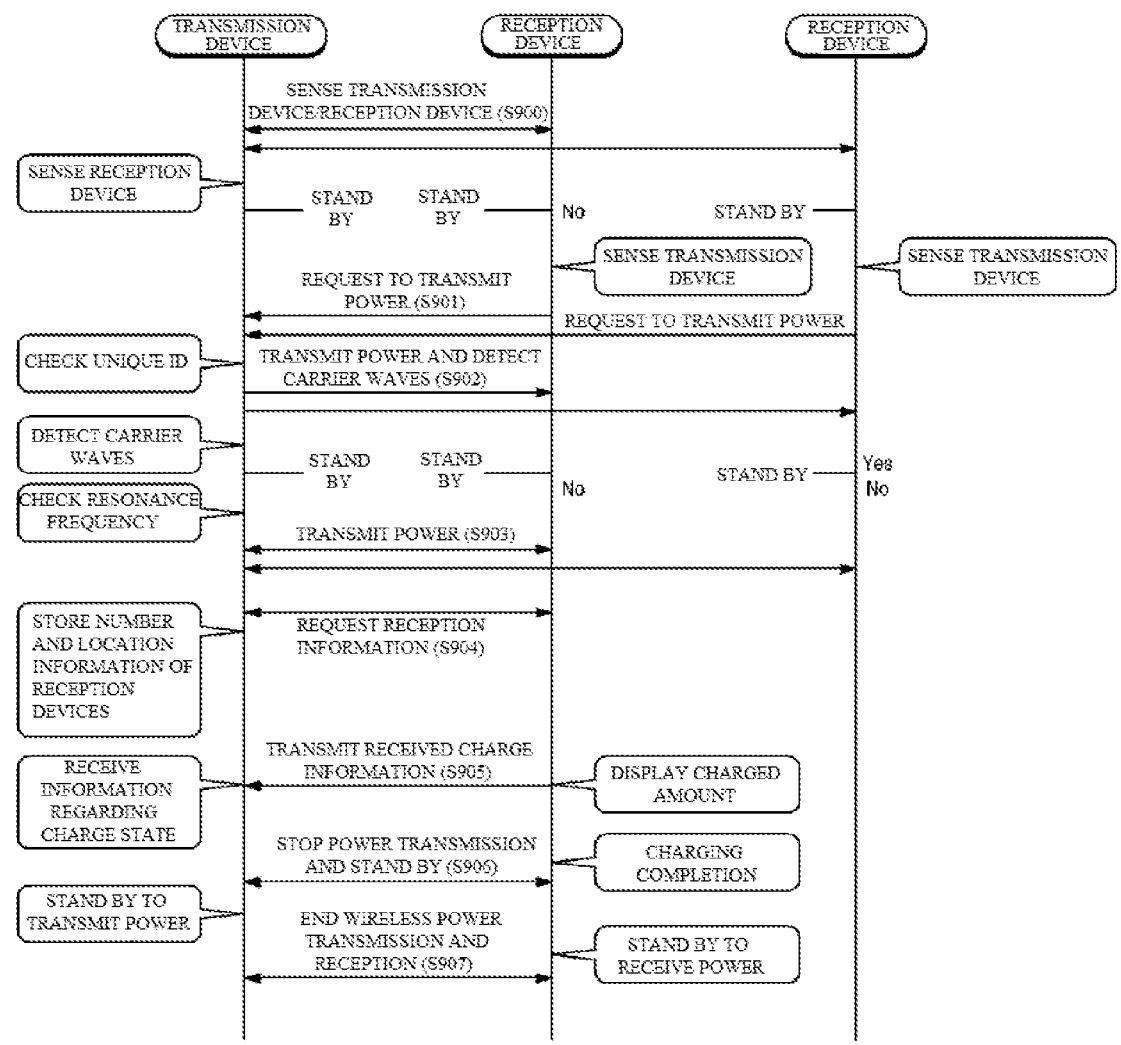
FIG. 11 is a diagram illustrating a process of simultaneously charging a plurality of reception devices according to the present invention.

FIG. 11 is a diagram illustrating a process of simultaneously charging a plurality of reception devices according to the present invention.

When there are a plurality of reception devices, a transmission device senses communication signals transmitted from the plurality of reception devices (operation S900).

In this case, the transmission device and the plurality of reception devices are switched to a standby state when the communication signals are not sensed (NO), and the plurality of reception devices request the transmission device to transmit power when the communication signals are sensed (YES) (operation S901).

Then, the transmission device checks a unique ID of each of the plurality of reception devices and transmits the power. The power transmitted from the transmission device is converted into ultrasonic waves and transmitted. When there is a foreign substance, an obstacle, or the like between the transmission device and the plurality of reception devices, carrier waves may be transmitted to the transmission device. Here, the transmission device detects the carrier waves (operation S902). The transmission device and the plurality of reception devices are switched to the standby state when the carrier waves are detected to exceed a predetermined allowance range (YES), and a resonance frequency is formed and the power is transmitted to the plurality of reception devices when the transmission device does not detect the carrier waves or when the carrier waves are in the predetermined allowance range (NO) (operation S903). Furthermore, determining the amount of a transferred ultrasonic signal, and blocking the supply of power from the transmission device or controlling the amount of power to be transmitted therefrom may be further performed by the transmission device.

In the above process, the transmission device transmits power using ultrasonic waves, requests the plurality of reception devices to provide reception information (operation S904), and receives and stores information regarding the number, locations, unique IDs, charge states, etc. of the plurality of reception devices (operation S905).

In operation S905, the transmission device receives signals representing charge states of the plurality of reception devices and recognizes the charge states. The amount of charged power may be further displayed on each of the plurality of reception devices for users' convenience. Upon receiving a charging completion request from a reception device among the plurality of reception devices, the transmission device transmits a response signal regarding charging completion and reception completion information to the reception device and the reception device stands by to receive power (operation S907).

Here, the parts of FIG. 10 described above and FIG. 11 described here are the same or substantially the same since the same or substantially the same structures or elements of the transmission device and the reception devices are described to explain the basic functions of the transmission device and the reception devices.

FIG. 11 may be basically the same as FIG. 10 described above in terms of the basic structures thereof but is different from FIG. 10 in terms of a process of detecting carrier waves by the transmission device, transmission of information regarding charging of the reception devices to the transmission device, a process of stopping the supply of power from the transmission device and standing by, a method of simultaneously charging the plurality of reception devices, etc. as illustrated in FIG. 11.

Figure 12:
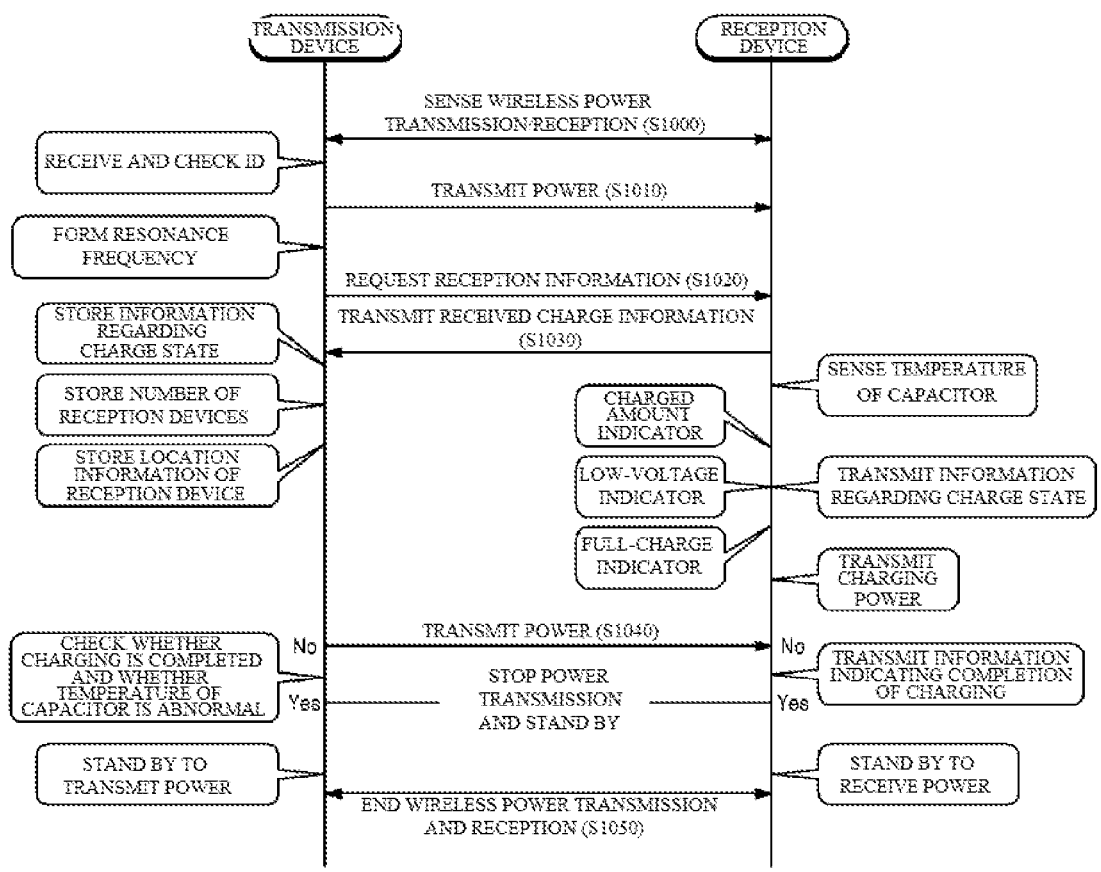
FIG. 12 is a diagram illustrating an overall flow of communication established between an ultrasonic transmission device and an ultrasonic reception device according to the present invention.

FIG. 12 is a diagram illustrating an overall flow of communication established between an ultrasonic transmission device and an ultrasonic reception device according to the present invention.

Referring to FIG. 12, a communication signal is basically exchanged between a transmission device and a reception device. However, another element may be further used between the transmission device and the reception device if necessary. This element may communicate with the transmission device via an external server to transmit a communication signal to the reception device, and communicate with the reception device via the external server to transmit a communication signal and a response signal to the transmission device.

As described above, wireless power transmission/reception is sensed by the transmission device and the reception device (operation S1000), in which a request for information is transmitted and received and compatibility between the transmission device and the reception device is determined during receiving and recognizing of an ID. Then power is transmitted from the transmission device to the reception device (operation S1010). A resonance frequency is formed and the reception device is requested to provide reception information (operation S1020).

In operation S1020, resonance frequencies of the transmission device and the reception device may be matched by controlling the resonance frequencies on the basis of the type or a load factor of the reception device and a signal received via a communication unit.

Then, during transmission of a response signal of the reception device to the transmission device, information regarding a value obtained by sensing a temperature of a capacitor of the reception device, a charge state according to the amount of charged power, the amount of power charged in the reception device which is being charged, and the like are transmitted, and the transmission device stores information regarding a charge state, the number of reception devices, the location of the reception device and a place in which the reception device is installed, etc. among the information regarding the reception device (operation S1030).

In addition, in operation S1030, the reception device may further include a display unit which controls a charge state and thus a user may view charging-related information. For example, an estimated charging time, a charged-amount indicator, a low-voltage indicator, a full-charge indicator, etc. may be displayed as the charging-related information. Here, the display unit may be embodied as a smart phone which is driven by an application or another portable electronic device.

Furthermore, in operation S1030, at least one among information regarding a reception device which is chargeable, information related to maintenance and repair, the order of priority assigned to a plurality of reception devices when there are a plurality of reception devices, information regarding whether the reception device is available, information indicating that charging is not possible in relation to temperature detection, a rate of power consumed in the reception device, information regarding the location and number of sensed transmission devices, and safety information may be further transmitted and stored.

Thereafter, when the transmission device determines and processes charging completion information (signal) or information indicating whether a temperature of the capacitor is abnormal (whether the temperature of the capacitor is above or below an allowance range) transmitted from reception device in operation S1030, based on information regarding a capacitor of the reception device (YES), the transmission device transmits a transmission power blocking signal and is switched to a standby state (operation S1050). In addition, in operation S1050, before and after the charging completion information is transmitted, a user of the reception device may arbitrarily stop transmission of power or request power to be transmitted again.

Figure 13:
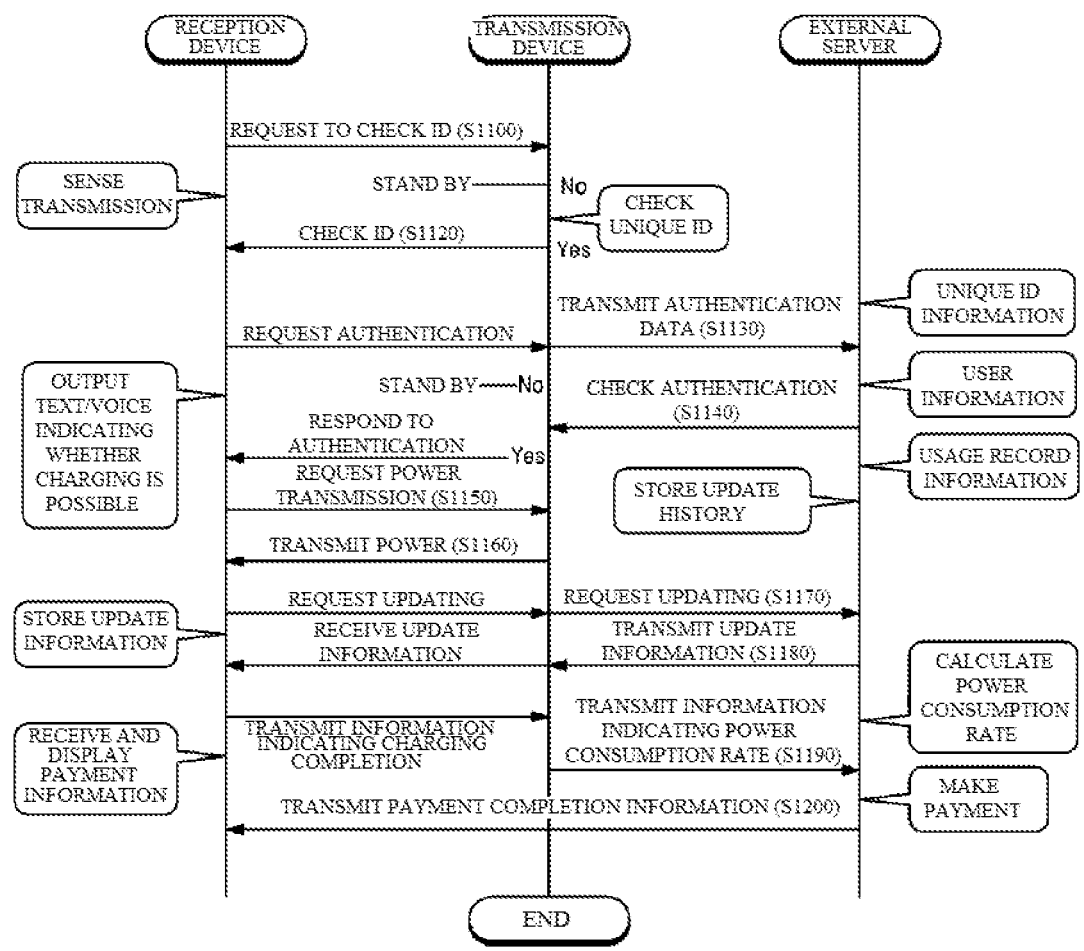
FIG. 13 is a diagram illustrating a process of performing recognition, authentication, updating, and payment in a range of ultrasonic wireless power charging, according to the present invention.

FIG. 13 is a diagram illustrating a process of performing recognition, authentication, updating, and payment in a range of ultrasonic wireless power charging, according to the present invention.

Referring to FIG. 13, when a user of a reception device enters a place in which a transmission device is installed (a wireless power transmission service region), the reception device requests the transmission device to check an ID (operation S1100).

In this case, the transmission device checks a unique ID of the reception device in response to the request for checking the ID (operation S1120). The transmission device and the reception device are switched to a standby state when the unique ID is not a predetermined unique ID (NO), and the transmission device transmits a response signal to the reception device when the unique ID is recognized (YES).

Here, a unique ID may be individually assigned to identify the type of the reception device. For example, the transmission device may check the number, locations, charge states, charged amount, etc. of reception devices, assign unique IDs to reception devices for which wireless power transmission (charging) is allowed and store the unique IDs, and identify each of the reception devices using a predetermined value.

The unique ID of the reception device includes unique ID information identifying the reception device, user information, and user subscription information, and means an identifier. A response signal from the reception device may include the unique ID individually assigned to the reception device. A communication unit may be included in each of the transmission device and the reception device.

The communication unit of the transmission device transmits authentication data DATA to an external server to authenticate the user of the reception device, based on information obtained by the communication unit of the reception device (operation S1130). The transmission device transmits a request for the authentication (user authentication) to the external server using the authentication data DATA regarding the reception device to perform the user authentication. As a result, when authentication of the unique ID information of the user fails (NO), the transmission device and the reception device may be switched to the standby state or may request re-authentication.

In operation S1140, the external server stores and transmits the unique ID information of the reception device, the user information, the user subscription information (the user authentication), usage record information, authentication request history information, etc., and performs the authentication on the basis of the stored information.

Then the transmission device receiving a response to the authentication (data regarding the authentication) from the external server transmits a result of determining the response to the authentication and a result of the response to the authentication (YES) to the transmission device or the reception device (operation S1140). As a result, the transmission device or the reception device receives the data regarding the authentication from the external server. Here, outputting text and/or voice related to the authentication determined on the basis of the user authentication, and determining whether a capacitor included in the reception device is chargeable on the basis of the result of determining the authentication may be further performed.

Next, the reception device requests the transmission device to transmit power (operation S1150), and the transmission device transmits power to the reception device in response to the request to transmit power (operation S1160).

In operation S1160, during the transmission of the power, the reception device requests the external server to update latest version information stored in the external server (operation S1170). In this case, when an update history stored in the external server reveals that version information of the transmission device and the reception device are older than the latest version information, basic information is downloaded and updated in the transmission device and the reception device (operation S1180).

After operation S1160, when charging of the reception device is completed, the reception device transmits a charging completion signal to the transmission device, and the transmission device or the reception device calculates a power consumption rate and transmits information indicating the power consumption rate to the external server (operation S1190). Through the above process, the external server receives and stores usage record information, usage information, payment information, and update histories of the transmission device and the reception device.

The reception device or the transmission device makes a payment (calculates the power consumption rate) by requesting to perform a payment process and responding to the request through a payment means registered beforehand on the basis of the power consumption rate and the usage record information (operation S1200).

In addition, during communication with the external server, the usage record information, the user information, the user subscription information (user authentication), the payment information, the update histories, the unique ID information, and authentication request history information may include information regarding an encryption key value, etc.

The external server may encrypt the stored usage record information, user information, user subscription information (user authentication), payment information, update histories, unique ID information, and payment process information, and transmit them to the transmission device or the reception device. An algorithm for such an encryption key value may be extended and changed by being updated at a later time.

Furthermore, the external server should be capable of efficiently registering and changing a communication protocol related to maintenance.

As described above, according to the present invention, the transmission device and the reception device may enable an ultrasonic wireless power charging service provider to provide a payment service or the like by transmitting charge information, a charged amount, user information, payment information, etc. to the external server through communication by authenticating information regarding a user (subscriber) of a corresponding ultrasonic wireless power reception device. The above information may be converted into communication packet data to make a payment.

Figure 14:
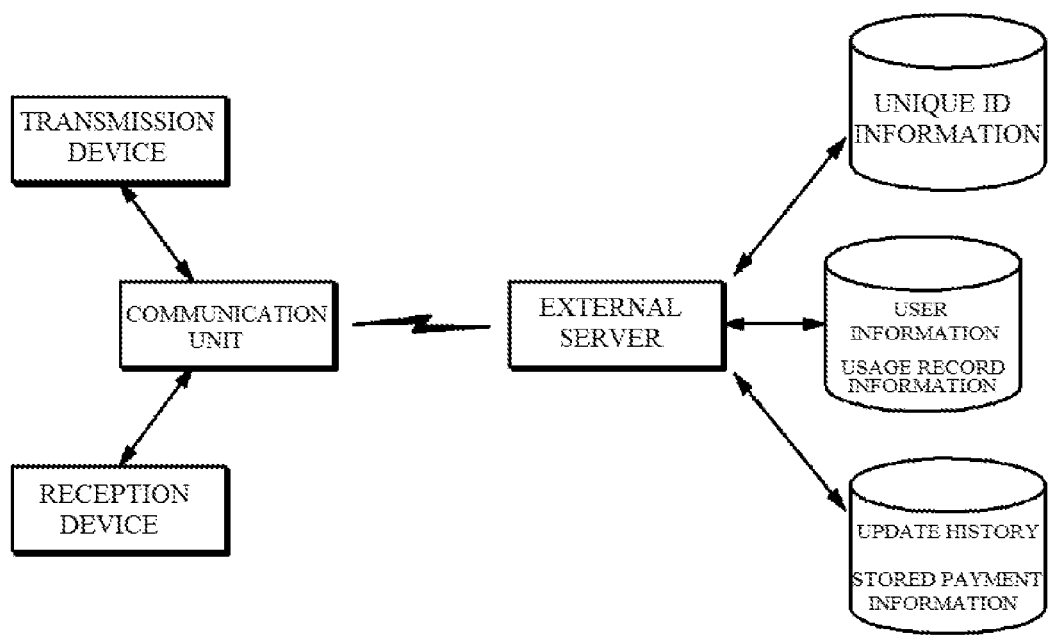
FIG. 14 is a diagram illustrating an overall flow of communication in an ultrasonic wireless power charging method according to the present invention.

FIG. 14 is a diagram illustrating an overall flow of communication in an ultrasonic wireless power charging method according to the present invention.

A communication unit providing a desired communication environment is present between a transmission device and a reception device. The communication unit may be built by being connected to an external server which remotely manages devices by connecting the devices to each other through communication.

Furthermore, the communication unit, the transmission device, and the reception device may use wideband, Wifi, Bluetooth, Zigbee, NFC, IRDA, Beacon, and UWB communication, etc. to establish communication.

In addition, the external server may use the same communication protocol or different communication protocols between the transmission device and the reception device. The external server stores and manages an update history, payment information, usage record information, user information, unique ID information of each of the reception device and the transmission device, etc.

The transmission device or the reception device may use different communication protocols, such as TCP/IP, CDMA, CAN, RS-485, RS-232, etc., with the external server. Long-Term Evolution (LTE), LTE-A, etc. which have been recently provided as communication technology may also be used as a communication protocol. These communication protocols are examples presented to assist understanding of the present invention, and the present invention is not limited thereto.

The present invention has been described and claimed above broadly but may be embodied in many different forms without departing from the structure, method, or other essential features thereof. The embodiments described in detail herein are merely examples and thus the present invention is not limited thereto. The scope of the present invention is defined by the claims rather than the specification described above. The elements set forth in the claims may be arranged and designed extensively in different structures, and all modifications are regarded as falling within the scope of the invention as long as they include the components claimed in the claims of the present invention.

What is claimed is:

1. An ultrasonic wireless power charging method performed by a transmission device and a reception device, comprising:
sensing a transmission device and a reception device which are within a range using signals generated by a communication unit of the transmission device and a communication unit of the reception device;

transmitting a sensed signal of the transmission device to the reception device;
transmitting a response signal of the reception device to the transmission device;
forming a resonance frequency to match resonance frequencies of the transmission device and the reception device;
receiving and recognizing a charged-state signal of the reception device by the transmission device; and
charging a capacitor included in the reception device by receiving power transmitted using the resonance frequency of the transmission device.

2. The ultrasonic wireless power charging method of claim 1, wherein the forming of the resonance frequency comprises matching the resonance frequencies of the transmission device and the reception device by adjusting the resonance frequencies according to a type or load factor of the reception device on the basis of a signal received via the communication unit.

3. The ultrasonic wireless power charging method of claim 1, wherein, when the transmission device or the reception device is not sensed, a standby state is switched to by controlling an amount of power of the transmission device or the reception device.

4. The ultrasonic wireless power charging method of claim 1, wherein the reception device further comprises a display unit configured to control a charge state, and
the display unit displays a full-charge indicator, a low-voltage indicator, or a charged amount display indicator.

5. The ultrasonic wireless power charging method of claim 1, wherein the communication unit of the transmission device receives and stores a charge state, an amount of charged power, a currently charged state of the reception device, a number of reception devices, or a location of the reception devices.

6. The ultrasonic wireless power charging method of claim 1, wherein the response signal of the reception device comprises a unique ID individually assigned to the reception device.

7. The ultrasonic wireless power charging method of claim 1, wherein the transmission device determines an amount of a transferred ultrasonic signal, and blocks power thereof or controls an amount of the power thereof.

8. The ultrasonic wireless power charging method of claim 1, wherein a frequency band of the transmission device comprises a resonance frequency for supplying power to the reception device.

9. The ultrasonic wireless power charging method of claim 1, wherein a frequency band of the reception device is formed to be in resonance frequency band for receiving power transmitted from the transmission device.

10. The ultrasonic wireless power charging method of claim 1, further comprising transmitting a charging completion signal or a block signal to the transmission device when charging of the capacitor is completed and/or a temperature of the capacitor is above or below an allowance range.

11. The ultrasonic wireless power charging method of claim 1, wherein the communication unit of the transmission device and/or the communication unit of the reception device comprises one of a wideband, Wifi, Bluetooth, Zigbee, near-field communication (NFC), infrared data association (IRDA), Beacon, a UWB, long-term evolution (LTE), and LTE-A.

12. The ultrasonic wireless power charging method of claim 1, further comprising performing user authentication through an external server via the communication unit of the transmission device and/or the communication unit of the reception device.

13. The ultrasonic wireless power charging method of claim 12, wherein the performing of the user authentication through the external server comprises:
transmitting authentication data of the reception device to the external server or the transmission device;
determining the authentication data of the reception device by transmitting the authentication data to the external server;
transmitting a result of determining the authentication data to the transmission device and/or the reception device from the external server; and
receiving the authentication data from the external server by the transmission device and/or the reception device.

14. The ultrasonic wireless power charging method of claim 12, further comprising:
receiving text and/or voice related to the authentication determined on the basis of the user authentication from the external server; and
determining whether the capacitor included in the reception device is chargeable by determining the authentication.

15. The ultrasonic wireless power charging method of claim 12, wherein the performing of the authentication through the external server comprises at least one of:
unique ID information of the reception device;
user information; and
user subscription information.

16. The ultrasonic wireless power charging method of claim 1, further comprising performing updating, by the communication unit of the transmission device and/or the communication device of the reception device, by downloading latest version basic information by comparing the basic information with an update history stored in the external server.

17. The ultrasonic wireless power charging method of claim 12, wherein the external server stores usage record information, user information, user subscription information (user authentication), payment information, an update history, and unique ID information of the transmission device and/or the reception device, and performs payment (calculates a power consumption rate) by inquiring whether a payment process is to be performed and making a response through a payment means registered beforehand on the basis of a power consumption rate and usage record information of the transmission device and/or the reception device.

18. The ultrasonic wireless power charging method of claim 17, wherein at least one among the usage record information, the user information, the user subscription information (user authentication), the payment information, the update history, and the unique ID information stored in the external server is transmitted to the transmission device or the reception device after being encrypted.

* * * * *